(12) United States Patent
Dunn

(10) Patent No.: US 6,342,840 B1
(45) Date of Patent: Jan. 29, 2002

(54) SERVICE CONTROLLER FOR TEMPERATURE-CONTROLLED APPLIANCES

(75) Inventor: Donald R. Dunn, Senoia, GA (US)

(73) Assignee: Hoshizaki America, Inc., Peachtree City, GA (US)

( * ) Notice: Subject to any disclaimer, the term of this patent is extended or adjusted under 35 U.S.C. 154(b) by 0 days.

(21) Appl. No.: 09/625,312

(22) Filed: Jul. 25, 2000

(51) Int. Cl.[7] .............................................. G08B 17/00
(52) U.S. Cl. ........................................ 340/585; 73/305
(58) Field of Search ................................ 340/585, 588, 340/589, 501, 500; 73/305

(56) References Cited

U.S. PATENT DOCUMENTS

| | | |
|---|---|---|
| 2,439,331 A | 4/1948 | Bean |
| 3,496,732 A | 2/1970 | Vogel et al. |
| 3,992,895 A | 11/1976 | Kramer |
| 4,045,973 A | 9/1977 | Anderson et al. |
| 4,169,357 A | 10/1979 | Kelley |
| 4,292,813 A * | 10/1981 | Paddock ...................... 62/158 |
| 4,297,852 A * | 11/1981 | Brooks ......................... 62/153 |
| 4,387,578 A | 6/1983 | Paddock |
| 4,502,287 A | 3/1985 | Hare et al. |
| 4,519,215 A | 5/1985 | Barnett |
| 4,567,474 A | 1/1986 | Wolin |
| 4,630,449 A | 12/1986 | Adams |
| 4,749,881 A | 6/1988 | Uhrich |
| 4,829,730 A | 5/1989 | Zeilinger |
| 4,834,169 A | 5/1989 | Tershak et al. |
| 4,990,057 A * | 2/1991 | Rollins ......................... 417/12 |
| 5,337,575 A | 8/1994 | Ishihara |
| 5,369,962 A | 12/1994 | Szynal et al. |
| 5,440,893 A * | 8/1995 | Davis et al. ................... 62/155 |
| 5,454,229 A | 10/1995 | Hanson et al. |
| 5,460,006 A | 10/1995 | Torimitsu |
| 5,533,360 A | 7/1996 | Szynal et al. |
| 5,546,073 A | 8/1996 | Duff et al. |
| 6,023,667 A * | 2/2000 | Johnson ....................... 73/305 |

* cited by examiner

*Primary Examiner*—John Tweel
(74) *Attorney, Agent, or Firm*—Arent Fox Kintner Plotkin & Kahn, PLLC

(57) ABSTRACT

A temperature-controlled appliance control system in which a compressor runtime is stored in a memory. If the runtime reaches a critical point an error message is displayed. The service technician can display this information by the monitor on the appliance, downloading it to a computer, relaying by modem, or any other conceivable way. The information displayed will go back in different intervals (runtime for day, week, and numbers of cycles). The memory eliminates the effect of defrost from the given compressor runtime.

13 Claims, 7 Drawing Sheets

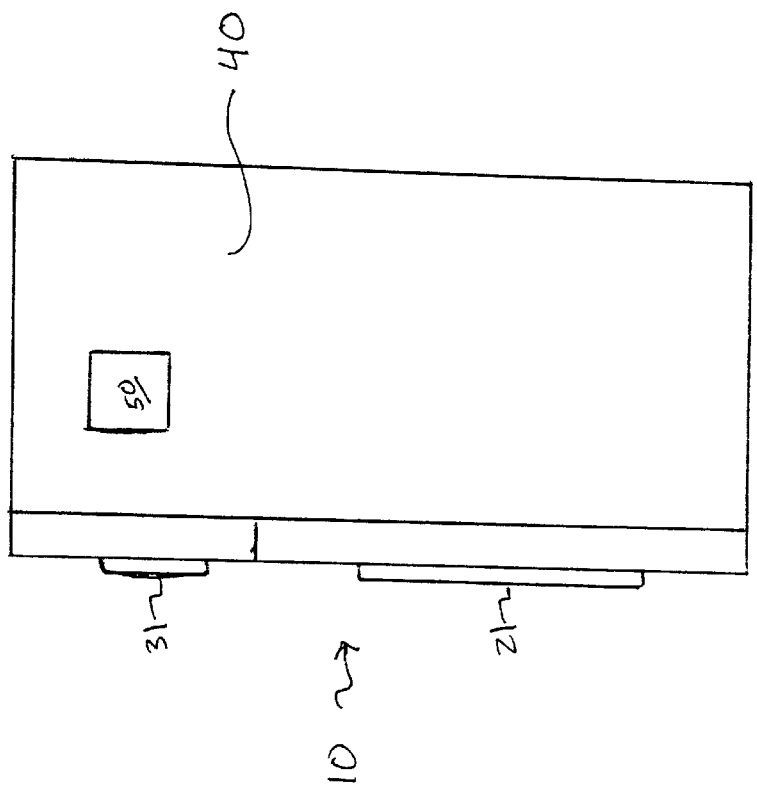
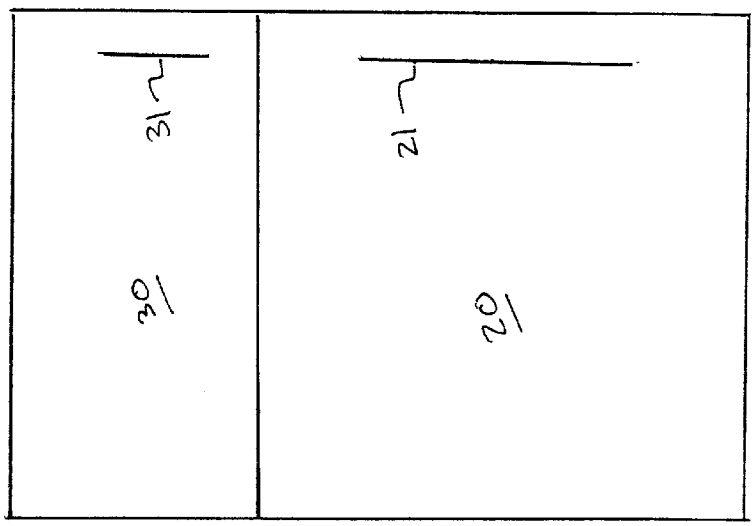

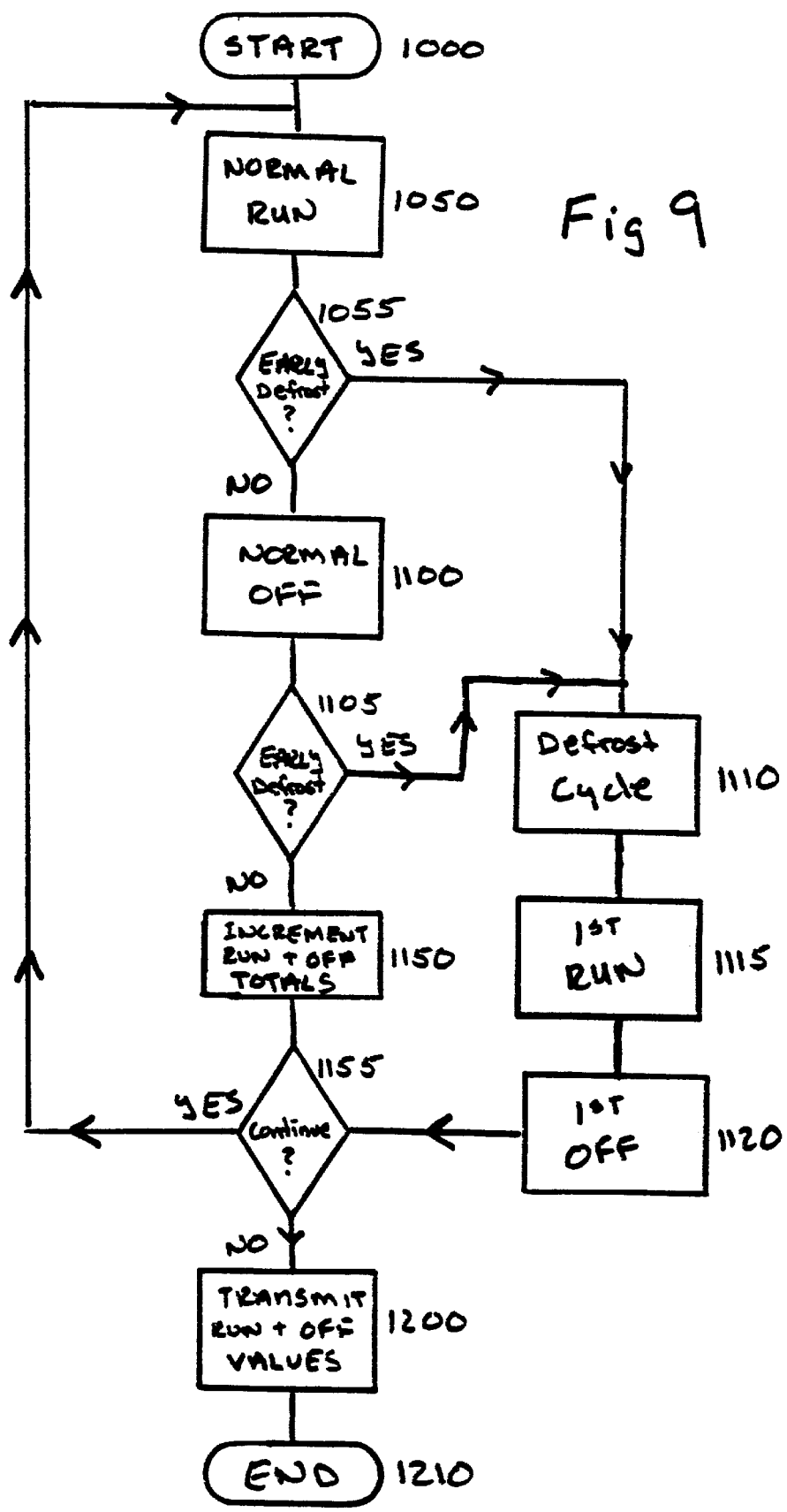

SERVICE CONTROLLER FOR TEMPERATURE-CONTROLLED APPLIANCES

BACKGROUND OF THE INVENTION

1. Field of the Invention

This invention relates to an electronic service controller for temperature-controlled appliances.

2. Description of Related Art

Service controllers that inform a user of the status of various operating conditions in a temperature-controlled appliance, such as, for example, a refrigerator and/or freezer, are well known. Such service controllers provide the user with an indication of the status of sensed conditions. Thus, the user is alerted to the existence of any abnormal operating conditions of the appliance which may indicate the appliance is malfunctioning or operating inefficiently, either of which may result in such problems as loss of food quality or even spoilage.

The presence of abnormal operating conditions within the appliance may be an indication that a malfunction of the equipment within the appliance has occurred. Obviously, in such a situation, appliance manufacturers have attempted to derive apparatuses and methods to alert the user as to the existence of the malfunction so the user can contact a service technician to correct the malfunction without unnecessary delay.

For example, U.S. Pat. No. 5,546,073 to Duff discloses an alarm system for a chiller that automatically detects abnormal consumption of electric power by a compressor unit. A cooling load is computed and then an alarm limit is determined. The alarm limit is computed based on a predetermined functional relationship between the alarm limit and coding load. An alarm is generated when an electric current exceeds the computed alarm limit.

In other conventional appliance sensing and indicating systems, a visual inspection is required when an over temperature condition is determined. For example, in the refrigerator art, U.S. Pat. No. 4,834,169 to Tershak et al. disclose a controller for operating a refrigerator that may experience an abnormal temperature condition. The controller includes a temperature sensor that senses the temperature in a portion of the refrigerator compartment to detect abnormally low temperatures in another portion of the refrigerator compartment. Corrective action is taken to eliminate the abnormal condition when such a condition is detected. Essentially, a compressor is prevented from re-energizing until the compartment temperature reaches a predetermined value.

Other types of conventional systems provide an additional indication whenever an over temperature condition has existed for longer than a predetermined period of time. Some conventional systems even shutdown the appliance. For example, U.S. Pat. No. 5,454,229 to Hanson discloses a method and apparatus to monitor conditions that may result in the shutdown of a refrigerator unit by monitoring a predetermined parameter of the refrigerator unit. A predetermined value of the predetermined parameter signals a mandatory shutdown. The predetermined parameter is monitored during the mandatory shutdown when the parameter indicates a restart value, the refrigeration unit is restarted.

U.S. Pat. No. 5,460,006 to Torimitsu discloses a system to monitor numerous food storage apparatuses. A detection device detects an internal temperature of a storage cabinet. A controller emits a control signal based on a predetermined temperature and the detected internal temperature to control operation of the cooling device such that the storage cabinet is maintained at the predetermined temperature. Electric signals are output that indicate the predetermined temperature condition and detected internal temperature to a signal receiver. The monitoring system monitors the operating conditions of the respective food storage apparatuses based on the signals received by the signal receiver. However, the system does not monitor compressor run time of any of the food storage apparatuses.

Also, in conventional refrigeration storage cabinet appliances, there are several well known methods and apparatus that determine defrost time and conditions. Occasionally, various abnormalities occur due to one or more faults in the storage cabinets. Recognizing the respective natures of the abnormalities is informative in determining the reason for the faults in the storage cabinet.

Unfortunately, the various conventional appliance monitoring methods and apparatus provide difficulties in indicating to the user and/or service technician the respective nature of the various abnormalities of the appliance. As most users are not trained in the appliance service-repair field, they are unable to determine the cause of the abnormalities. Furthermore, for a service technician to ascertain what may be causing the abnormalities in the appliance would require the service technician to physically monitor the appliance for an extended period of time, which is impractical and too time/money consuming. In refrigeration storage cabinet appliances, it would benefit the service technician to know how long defrost times are, how long the compressor has been running, and the history of the cabinet during the past few days or weeks in determining the cause of any abnormalities.

SUMMARY OF THE INVENTION

An object of this invention is to overcome the above-discussed drawbacks of conventional appliance monitoring apparatus and methods.

Another object of this invention is to provide a service controller for temperature-controlled appliances that monitors the storage cabinet operational history of a refrigerator, freezer, chiller, or other such appliance. A microprocessor that runs the appliance also stores compressor run time data and correlates such to a percentage of run time over a predetermined period of time, such as, for example, an hour, a day, or even more than a week. The service controller can display the relevant information on an exterior of the appliance, download such information to a computer, relay the information to a remote location via a modem or other known or later developed information transmission device.

If the compressor run time reaches a predetermined critical value, the service controller may display an error signal on the cabinet warning that the cabinet should be inspected or possibly serviced. The service controller also eliminates any effect defrosting may have on this determination to ensure the user and/or service technician is provided with the most relevant and accurate information.

BRIEF DESCRIPTION OF THE DRAWINGS

Other objects and features of this invention will be better understood from the following detailed description, with reference to the accompanying drawings, wherein:

FIG. 1 is a perspective view of a temperature-controlled appliance according to this invention;

FIG. 2 is a side view of the appliance illustrated in FIG. 1;

FIG. 9 is a flowchart diagramming a percent compressor run time calculation routine.

DETAILED DESCRIPTION OF PREFERRED EMBODIMENT(S)

Figure 3:
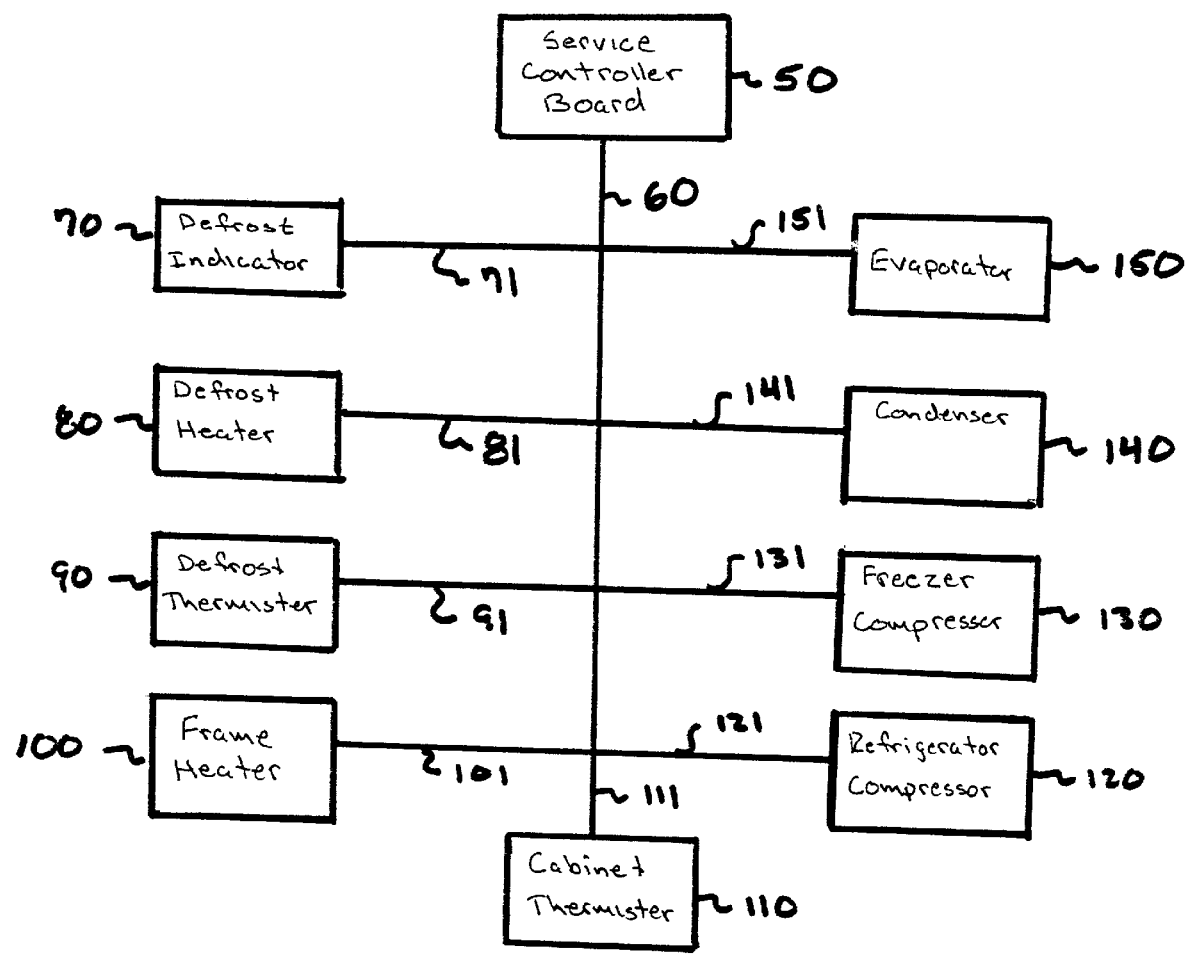
FIG. 3 is a schematic diagram of a service controller and relevant components of the appliance.

Referring to FIG. 1, a perspective view of a temperature-controlled appliance or cabinet 10, such as, for example, a refrigerator and freezer storage cabinet, is illustrated. The refrigerator cabinet portion 20 is accessible using a handle 21 in a well known manner. Likewise, the freezer cabinet portion 30 is accessible using another handle 31 in a similar manner.

Now referring to FIG. 2, which is a side view of the storage cabinet 10 shown in FIG. 1, it can be seen that a side surface 40 of the cabinet 10 has a service controller board 50 incorporated therein. The service controller 50 is connected to relevant components of the cabinet 10 and monitors the operational history of the cabinet 10. The service controller 50 can display the relevant information of the operational history of the cabinet 10 on an exterior of the cabinet 10, relay the information to a remote location via a modem or other information transmission device.

It should be noted that while FIGS. 1–2 illustrate a two-part cabinet 10, i.e., the refrigerator cabinet portion 20 and freezer cabinet portion 30, it is within the scope of this invention to provide a cabinet having only one such portion or more than two. The depiction of two portions 20 and 30 is merely illustrative to simplify the explanation of this invention. Also, the location, size and overall appearance of the service controller board 50 is purely illustrative and is not intended to limit this invention. For example, the board 50 may be positioned on or in a front or top surface of the cabinet 10.

FIG. 3 is a schematic diagram illustrating a relationship of the service controller board 50 and relevant components of the cabinet 10. The service controller 50 is connected to the relevant components by a bus 60. In particular, a defrost indicator 70 is connected to the bus 60 by line 71. The defrost indicator 70 indicates whether the cabinet 10 is conducting a defrosting operation by functioning between an ON condition or an OFF condition. As such, when functioning in the ON condition, the defrosting operation is being conducted. Contrarily, when in the OFF condition, the defrosting operation is not being conducted.

A defrost heater 80 is connected to the bus 60 by line 81. The defrost heater 80 operates between an ON condition and an OFF condition. When operating in the ON condition, the defrost heater 80 provides heat to the cabinet 10 so that a desired portion of the cabinet 10 may be defrosted.

A defrost thermistor 90 is connected to the bus 60 by line 91. The defrost thermistor 90 is a thermal resister having a polycrystalline semiconductor material that has a resistance that varies rapidly with changes in temperature. Accordingly, the defrost thermistor 90 senses the temperature variations during the defrosting operation to help maintain that the defrosting operation is being conducted between a preset upper temperature and preset lower temperature.

A frame heater 100 is connected to the bus 60 by line 101 and provides heat to a frame (not shown) of the cabinet 10. A cabinet thermistor 110 is also a thermal resister having a polycrystelline semiconductor material that has a resistance that varies rapidly with changes in temperature. As such, the cabinet thermistor 110 senses the temperature variations of the cabinet 10. The cabinet thermistor 110 is connected to the bus 60 by line 111.

Figure 4:
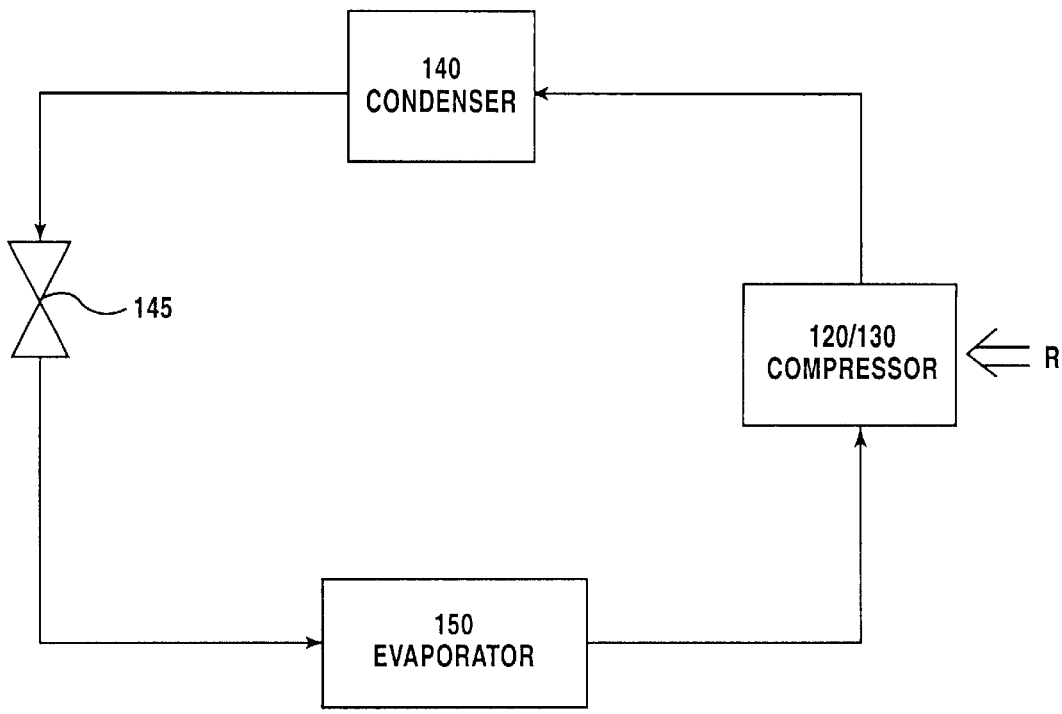
FIG. 4 is a schematic diagram illustrating a refrigeration cycle.

Typically, refrigerator and freezer storage cabinets use refrigerant R as a working fluid. Referring to FIG. 4, the refrigerant R enters a compressor as a vapor and is compressed to a condenser pressure. The compressor 120 of the refrigerator portion 20 is connected to the bus 60 by line 121 while the compressor 130 of the freezer portion 30 is connected to the bus 60 by line 131 (FIG. 3).

The compressed refrigerant R is at a very high temperature when it leaves either the refrigerant compressor 120 or the freezer compressor 130. The refrigerant R then cools down, and condenses as the refrigerant R flows through coils (not shown) of a condenser 140 by rejecting heat to a surrounding medium, such as, for example, the ambient air. The condenser 140 is connected to the bus 60 by line 141 (FIG. 3).

After passing through the condenser 140, the refrigerant R passes through an expansion valve 145. The pressure and temperature of the refrigerant R drops drastically because of the throttling effect of the valve 145. The low-temperature refrigerant R then enters an evaporator 150, which is connected to bus 60 by line 151 (FIG. 3), wherefrom the refrigerant R evaporates after absorbing heat from the cabinet 10. The refrigerant R then leaves the evaporator 150 and reenters the compressor 120, 130 to begin the cycle again.

Figure 5:
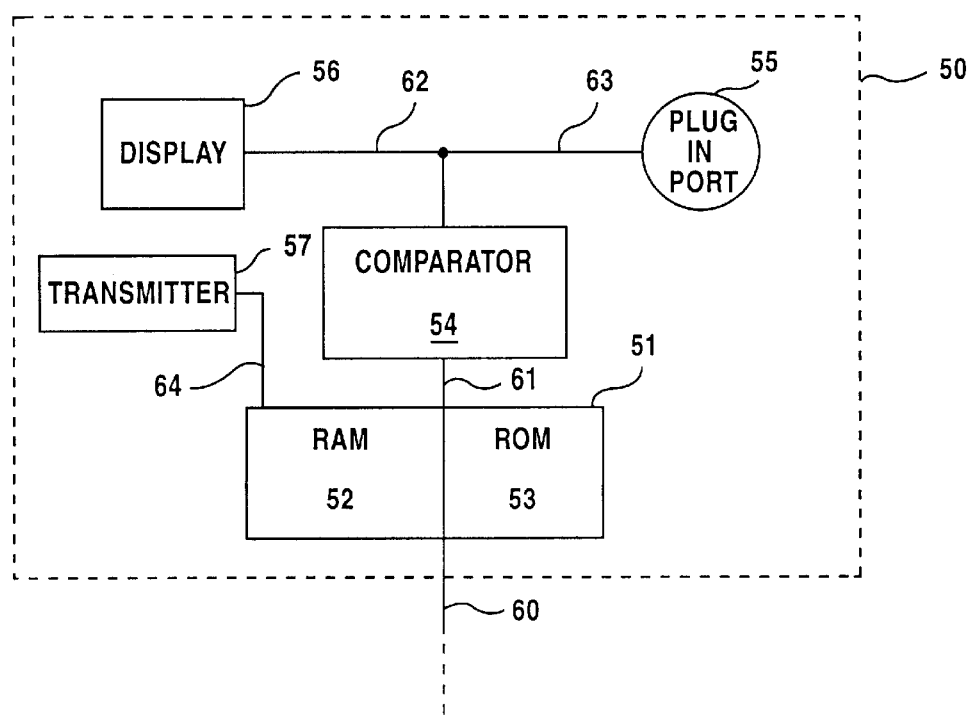
FIG. 5 is a schematic diagram of the service controller.

Referring to FIG. 5, which illustrates a schematic of the service controller 50, the signals conveyed along bus 60 are provided to a suitable memory device 51 within the service controller 50. An acceptable memory device 51 would include at least a RAM 52 and/or ROM 53 type memory. The memory device 51 is connected to a comparator 54 by line 61 along which the values of the signals transmitted to the memory device 51 from bus 60 are conveyed. The comparator 54 uses a discriminatory process to determine the operating conditions of various components of the cabinet 10 based on the signals conveyed to the memory device 51.

The results determined by the comparator 54 can be sent to a display 56 as a digital or analog signal along line 62. The display 56, which can be any well known display, such as an LED screen, for example, can alert a user as to the operating conditions of the cabinet 10. The display 56 could alert the user any number of ways, for example, by written text explaining the status of the operating conditions, color system where green indicates normal operations, orange indicates caution as an abnormality has been detected, and red indicates a critical abnormality exists requiring the attention of certified technician.

The service controller 50 also may have a plug-in-port 55 that can permit a technician in the field to plug in a diagnostic device (not shown), such as a portable computer, for example, that can download the values of the signals received by the comparator 54 from the memory device 51 along line 63. The diagnostic tester may be able to download as much stored information regarding the operating conditions of the cabinet 10 as necessary. In other words, the technician may be able to download any information stored in the memory device 51 from the last hour, day, week, and the like that the cabinet 10 has been operating.

Also, it is within the scope of this invention for the information stored in the memory device 51 to be transmittable by a transmitter 57 connected to the memory device by line 64. The transmitter 57 may be any well known or later developed device capable of conveying information without requiring a direct connection to a receiver-type device such as, for example, a modem, antennae, transponder, or the like. Thus, the operation condition and/or history of the cabinet 10 can be conveyed to a technician at a location remote from the location of the cabinet 10.

Now, the general control of the refrigerator portion 20 of the cabinet 10 will be discussed below.

Figure 6:
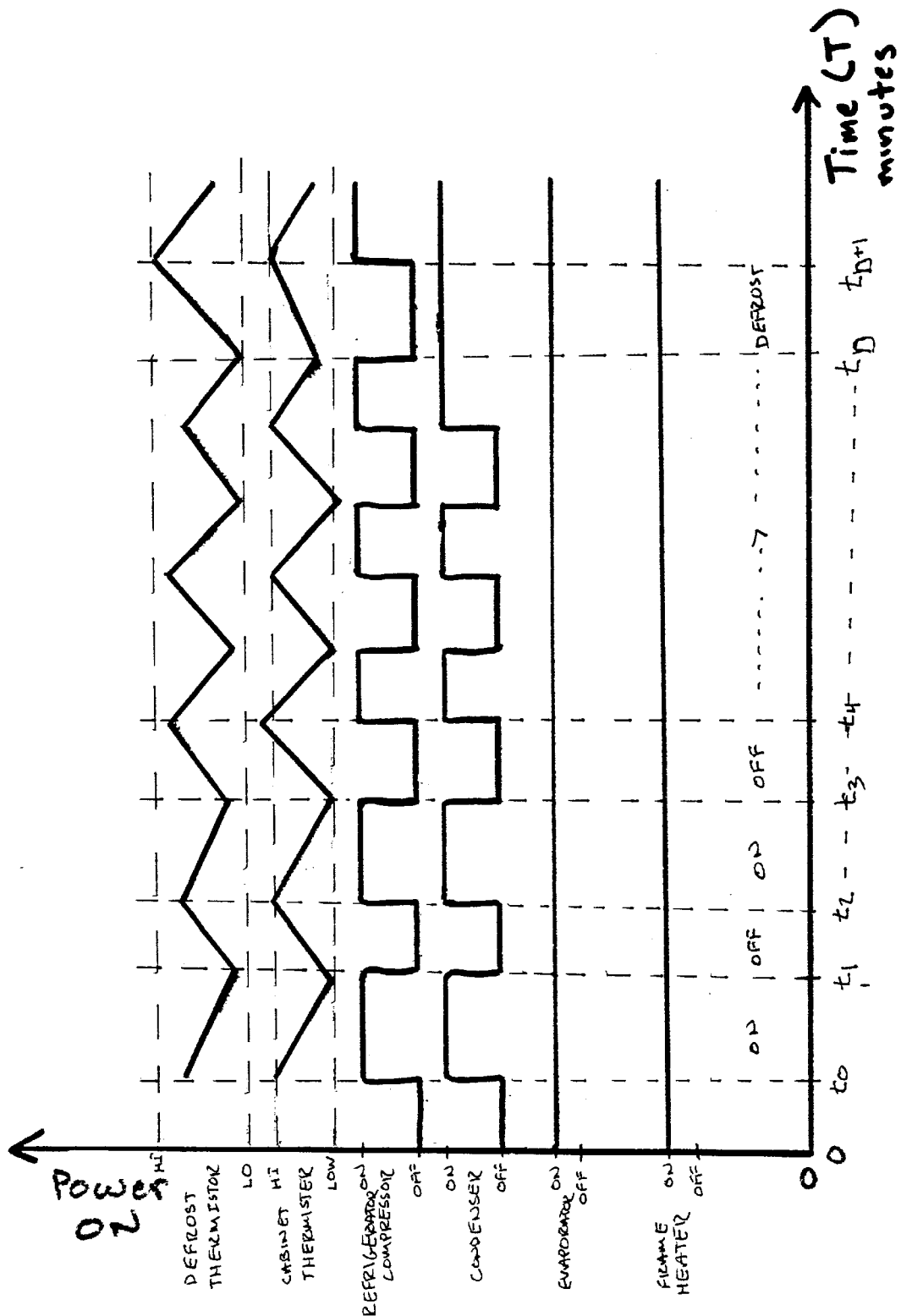
FIG. 6 is a refrigerator control timeline.

Referring to FIG. 6, which illustrates a timeline of controlling the operation of the refrigerator portion 20, it can be seen that the frame heater 100 and evaporator 150 are constantly in an ON state. As such, heat emitted from the frame heater 100 is continuously being absorbed by the low-temperature refrigerant R entering the evaporator 150 so that the refrigerant R can evaporate. Also, it can be seen that at start time $t_0$, the refrigerator compressor 120 and condenser 140 are turned ON.

Accordingly, the refrigerant R passes through refrigerator compressor 120 and condenser 140 while the compressor 120 and condenser are operating between start time $t_0$ and time $t_1$. As discussed above, the refrigerant R leaves the refrigerator compressor 120 at a relatively high temperature and enters the condenser 140 as such. But, the refrigerant R leaves the condenser 140 at a much lower temperature than when the refrigerant R entered therein. Then, after leaving the condenser 140, the temperature of the refrigerant R drops substantially after passing through the expansion valve 145. The timeline verifies this as indicated by the drop in temperature measured by the defrost thermistor 90 and cabinet thermistor 110 during the $t_0 \rightarrow t_1$ time period.

During the $t_1 \rightarrow t_2$ time period, it can be seen that the refrigerator compressor 120 and the condenser 140 are turned OFF. Incidently, the $t_1 \rightarrow t_2$ time period should be approximately 2.5 minutes in duration. During this time, the refrigerant R enters the evaporator 150 and absorbs heat from the cabinet 10 emitted by the frame heater 100. Because the refrigerator compressor 120 and condenser 140 are both OFF, the refrigerant R is not being chilled and the temperature within the refrigerator portion 20 increases, as is illustrated by the defrost and cabinet thermistor 90 and 110 measured values during this time.

The above-described cycle continues until the $t_D$ time period wherein the condenser 140 remains ON and the refrigerator compressor 120 is turned OFF. At this point, from time $t_D \rightarrow t_D+1$, the condenser 140 continues rejecting heat from the refrigerant R to the surrounding atmosphere. During this $t_D \rightarrow t_D+1$ time period, the refrigerator portion 20 of the cabinet 10 is defrosting, that is, the refrigerator portion 20 is thawing or heating up. Again, this is illustrated by the noted increased in temperature measured by the defrost and cabinet thermistors 90 and 110.

Then, after the defrost time period $t_D \rightarrow t_D+1$, the condenser 140 stays ON and the refrigerator compressor 120 is turned ON again. In other words, the condenser 140 and refrigerator compressor 120 operate in a first ON cycle after defrosting that is substantially similar to the cycle illustrated by the $t_0 \rightarrow t_1$ time period. Similarly, after the first ON or run cycle after defrosting, the condenser 140 and refrigerator compressor 120 stop operating in a first OFF cycle after defrosting that is substantially similar to the cycle illustrated by the $t_1 \rightarrow t_2$ time period.

It should be noted that the refrigerator compressor 120 ON time periods are known as normal run cycles. The refrigerator compressor 120 OFF time periods are known as normal OFF cycles. Also, the defrosting time periods $t_D \rightarrow t_D+1$ are not computed in determining a percentage run time for the refrigerator compressor 120 to maintain a more accurate record of the performance of the refrigerator compressor 120. The percentage run time calculation will be discussed in further detail later.

Now, the general control of the freezer portion 30 of the cabinet 10 will be discussed below.

Figure 7:
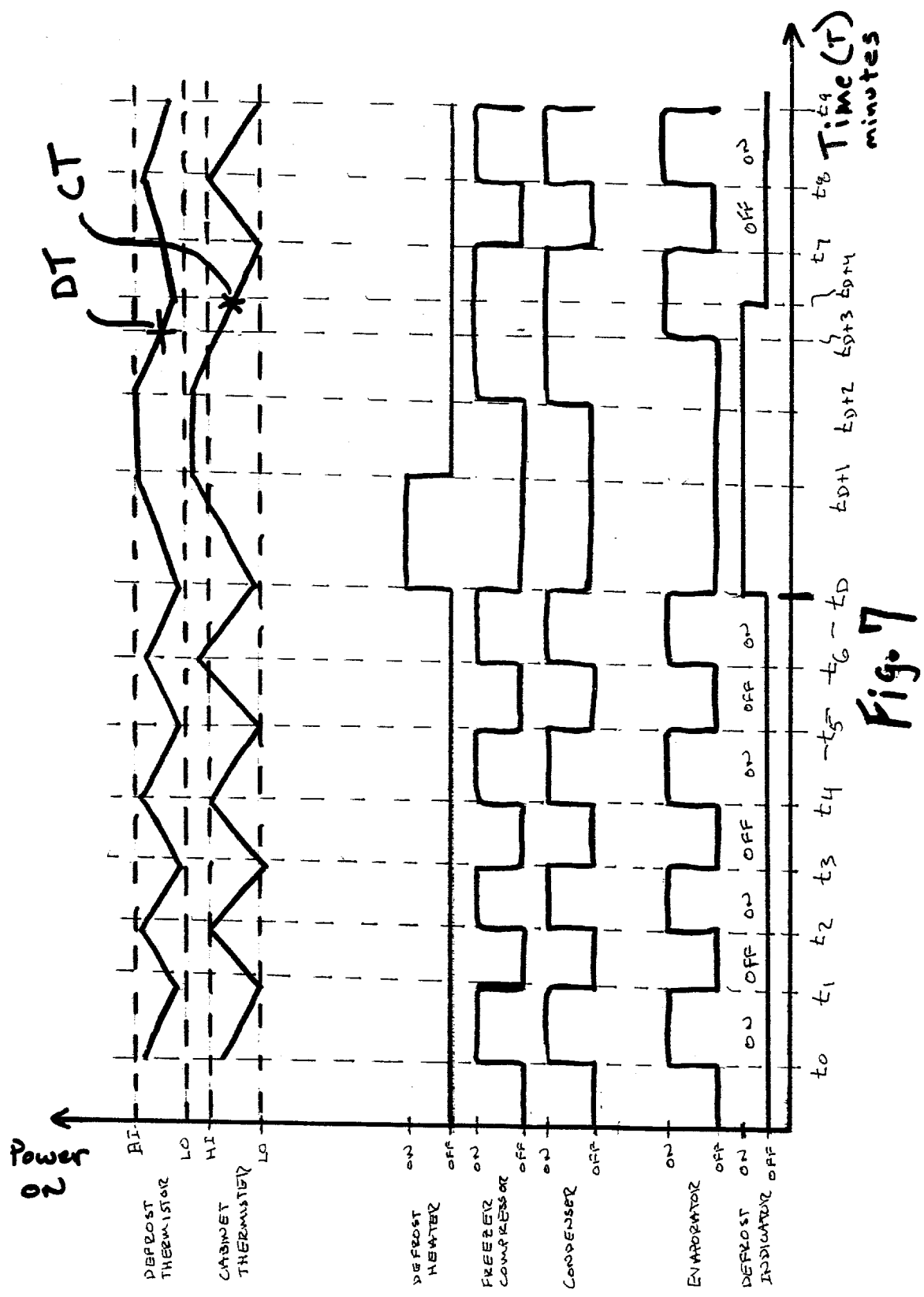
FIG. 7 is a freezer control timeline.

Referring to FIG. 7, which illustrates a timeline of controlling the operation of the freezer portion 30, it can be seen that unlike in FIG. 6, no heat is emitted from the frame heater 100 to the freezer portion 30 for obvious reasons. That is, while some heat is desired to be emitted into the refrigerator portion 20 to cause the refrigerant R to evaporate, no such effort is necessary in the freezer portion 30 as it is desirable to maintain moisture and a low temperature therein. Also, unlike in FIG. 6, the evaporator 150 in the freezer portion 30 is not maintained in a constant ON position, but rather operates in a cycle substantially in phase with the normal operating cycle of the freezer compressor 130 and the condenser 140.

Also, the freezer portion 30 has features that are not present in the refrigerator portion 20. For example, the freezer portion 30 includes a defrost heater 80 that emits heat during the defrost time period $t_D \rightarrow t_D+1$. However, the defrost heater 80 is usually maintained in an OFF state during the normal run cycles of the freezer compressor 130 and condenser 140, as well as during the first run cycles after the defrost time period $t_D \rightarrow t_D+1$.

Furthermore, the freezer portion 30 also includes defrost indicator 70 that provides a signal to the service controller 50 along line 71 and bus 60 as to whether defrosting is being performed. As illustrated in FIG. 7, the defrost indicator 70 is in the OFF state during normal run cycle time periods of $t_0 \rightarrow t_D$ and $t_7 \rightarrow t_9$. Likewise, the defrost indicator 70 is in the ON state indicating defrosting is being performed during the time periods of $t_D \rightarrow t_D+n$.

As discussed above, the refrigerant R passes through the freezer compressor 130, condenser 140 and evaporator 150 while the compressor 130, condenser 140, and evaporator 150 are operating in the ON state between start time $t_0$ and time $t_1$. During the ON state, the drop in temperature of the freezer portion 30 due to the chilled refrigerant R is indicated by the drop in temperature measured by the defrost and cabinet thermistor 90 and 110, respectively. Similarly, the freezer compressor 130, condenser 140, and evaporator 150 do not operate and are in the OFF state from time $t_1$ to $t_2$. During the OFF state, the refrigerant R is not being chilled and the temperature within the freezer portion 30 increases as indicated by the defrost and cabinet thermistor 90 and 110, respectively.

The ON and OFF state of the freezer compressor 130, condenser 140, and evaporator 150 during time periods $t_0 \rightarrow t_D$ correspond to normal run and normal off cycles, respectively. It should be noted that each time period or ON/OFF cycle has a duration of approximately 2.5 minutes. Of course, different appliances may have different time periods or cycle durations depending on the needs and requirements of the appliance.

The above described cycles continue until the $t_D$ time period wherein each of the freezer compressor 130, condenser 140, and evaporator 150 are turned OFF. Simultaneously therewith, the defrost heater 80 is turned ON, thereby increasing the temperature within the freezer portion 30. The temperature increase is measured by the defrost and cabinet thermistors 90 and 110, respectively. At this time, the defrost indicator 70 sends a signal to the service controller 50 indicating that defrosting is occurring. It should be noted that the service controller 50 can be adjusted to set the time period at which defrosting takes place, such as for example, every 3, 4, 8, 9, 12 hours and the like.

Then, at time period $t_D+1$, the defrost heater 80 is turned OFF. However, the freezer compressor 130, condenser 140, and evaporator 150 are kept in the OFF state. As such, the refrigerant R is not being chilled and the temperature within the freezer portion 30 is not becoming colder. Therefore, the temperature within the freezer portion 30 is maintained at a relatively level temperature as measured by the defrost and cabinet thermistors 90 and 110, respectively. Furthermore, the defrost indicator 70 continues to send a signal to the service controller 50 indicating that the defrosting operation is continuing. Incidentally, the $t_D+1$ time period has a duration of approximately 1.5 minutes, but may be varied depending on the needs and requirements of the appliance.

At time period $t_D+2$, the service controller 50 sends a signal to turn the freezer compartment 130 and condenser 140 ON to chill the refrigerant R. Consequently, the defrost thermistor 90 and cabinet thermistor 110 measure the drop in temperature of the freezer portion 30. However, as defrosting is still occurring, the defrost indicator 70 continues to send a signal to the service controller 50 indicating as such and the evaporator 150 is still in the OFF state.

When the defrost thermistor 90 measures a predetermined defrost set point temperature DT and sends a signal indicating such to the service controller 50, a signal is sent by the service controller 50 to turn the evaporator 150 ON at time $t_D+3$. During time $t_D+3$, defrosting continues and the defrost indicator 70 sends a signal to the service controller 50 indicating as such. However, because the freezer compressor 130, condenser 140, and evaporator 150 all operate to cool the refrigerant R, the temperature measured by the defrost and cabinet thermistors 90 and 110, respectively, continues to lower.

$A_t t_D+4$, the cabinet thermistor 110 measures a predetermined cabinet set point temperature CT. The cabinet thermistor 110 sends a signal to the service controller 50 indicating the cabinet set point temperature CT has been reached. The service controller 50 then sends a signal to turn the defrost indicator 70 OFF, thereby indicating that the defrost operation is concluded. Then, at time period $t_7$, the normal run and off cycles discussed above in regards to time periods $t_0 \to t_D$ above start again.

Figure 8:
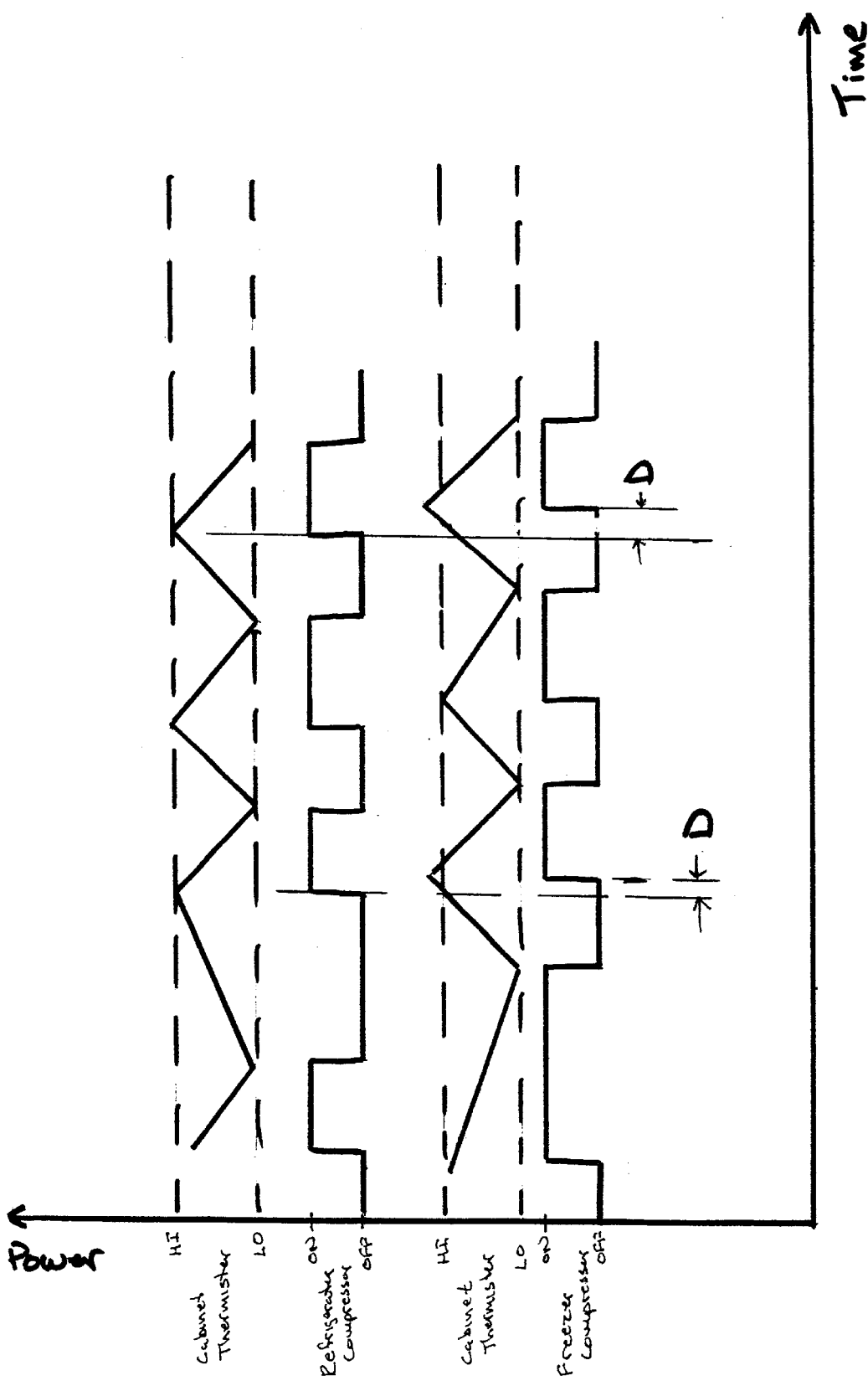
FIG. 8 is a timeline illustrating a relationship between refrigerator and freezer compressors.

Referring to FIG. 8, a timeline illustrating the relationship between refrigerator and freezer compressors 120 and 130, respectively, is shown. Furthermore, the service controller 50 delays the start up of the refrigerator compressor 120 by an adjustable predetermine delay D. The predetermined delay D can be a standard time of approximately 2.5 minutes but should not be less than 10 seconds.

Next, an explanation of the calculation of the percent compressor run time will be explained.

Referring to FIG. 9, a flowchart diagraming the percent compressor run time calculation routine is illustrated. The calculation starts at step 1000. Then, at step 1050, the normal run cycle is performed by the compressor 120 or 130. This corresponds to times $t_0, t_2, t_4$, etc. of FIGS. 6–7.

Next, at step 1055, a determination is made by the service controller 50 if an early defrost cycle is to be performed. If the determination is NO, then the routine continues. Then, at step 1100, the normal OFF cycle is performed by the compressor 120 or 130.

Then, at step 1105, another determination is made by the service controller 50 if an early defrost cycle is to be performed. If the determination is NO, then the routine continues. At step 1150, a counter (not shown) in the service controller 50 increments a compressor run time value R by a value equal to the normal run time, a compressor off time value N by a value equal to the normal off time, and a run cycle C is incremented by 1 to indicate the number of cycles the percent calculation is measuring.

Next, at step 1155, a determination is made to continue the calculation. If the determination is NO, then the routine continues. At step 1200, the service controller 50 calculates the percentage compressor run time for C cycles use the following equation:

$$\% \text{ run time for } C \text{ cycles} = \frac{R}{R+N} \times 100 \qquad (1)$$

The result of equation (1) can be downloaded form the service controller by a technician via the plug-in-port 55, displayed by the display 56 to a user and/or the technician, or relayed to the technician by the transmitter 57 to a location remote from the cabinet. The routine then ends at step 1210.

However, if at step 1155 the determination is made to continue, the routine returns to step 1050 where another normal run cycle for the compressor 120 or 130 is performed. Then, if at step 1055 a YES determination is made that early defrost is to be performed, the routine goes to step 1110. At step 1110, the defrost cycle of time $t_D \to t_D+n$ is performed.

Next, at step 1115, the first run cycle of the compressor 120 or 130 is performed. Then, at step 1120, the first off cycle of the compressor 120 or 130 is performed. Next, the routine goes to step 1155 where the determination is made whether to return to step 1050 to continue the routine or to proceed to steps 1200 and 1210 to end the routine.

In addition, many modifications may be made to adapt particular situations or materials to the teachings of this invention without departing from the scope thereof. Therefore, it is contended that this invention not be limited to the particular embodiments disclosed herein, but includes all embodiments within the spirit and scope of the disclosure.

What is claimed is:

1. A control system for a temperature-controlled appliance having a refrigerator compressor and a freezer compressor to monitor an operational history of the appliance, comprising:

a signal line connected separately to the refrigerator compressor and the freezer compressor, the signal line conveying run times of the refrigerator compressor and freezer compressor; and a service controller having a memory device, wherein the service controller calculates a percentage run time over a predetermined period of time of the refrigerator compressor and freezer compressor run times that are conveyed along the signal line to the memory device and compares the calculated percentage run time to a predetermined critical value to determine if a warning signal should be issued that the appliance should be inspected, and wherein defrosting time periods are not computed in calculating the refrigerator compressor run time to obtain a more accurate performance record of the refrigerator compressor.

2. The control system according to claim 1, wherein the memory device comprises at least one of a random access memory and a readable only memory.

3. The control system according to claim 2, wherein the service controller further comprises a comparator that uses a discriminatory process to determine if the calculated percentage run time of either one of the refrigerator compressor and freezer compressor exceeds the predetermined critical value.

4. The control system according to claim 3, wherein the service controller further comprises a display to alert a user that the appliance should be inspected.

5. The control system according to claim 4, wherein the service controller further comprises a plug-in-port that can receive a diagnostic device to transfer signals of values received by the comparator from the memory device.

6. The control system according to claim 5, wherein the service controller further comprises a transmitter to transmit information from the memory device to a location remote from the appliance.

7. The control system according to claim 1, wherein the predetermined period of time includes a cycle which comprises at least one of each of a normal run time and a normal off time of either one of the refrigerator compressor and the freezer compressor.

8. A method for monitoring an operational history of a temperature-controlled appliance having a refrigerator compressor and a freezer compressor using a control system comprising a signal line and service controller, the service controller having a memory device, the method comprising the steps:

connecting the signal line to the refrigerator compressor and the freezer compressor;

conveying run times of the refrigerator compressor and freezer compressor along the signal line;

calculating a percentage run time over a predetermined period of time of the refrigerator compressor and the freezer compressor using the service controller; and comparing the calculated percentage run time to a predetermined critical value stored in the memory device, and wherein defrosting time periods are not computed in calculating the refrigerator compressor run time to obtain a more accurate performance record of the refrigerator compressor.

9. The method according to claim 8 further comprising the step of determining if a warning signal should be issued that the appliance should be inspected.

10. The method according to claim 9 further comprising the step of determining if the calculated percentage run time of either one of the refrigerator compressor and freezer compressor exceeds the predetermined critical value.

11. The method according to claim 10 further comprising the step of alerting a user that the user should be inspected.

12. The method according to claim 11 further comprising the step of transferring signals of values received from the memory device to a diagnostic device.

13. The method according to claim 12 further comprising the step of transmitting the values from the memory device to a location remote from the appliance.

* * * * *